United States Patent
Hogge et al.

(10) Patent No.: US 6,806,347 B2
(45) Date of Patent: Oct. 19, 2004

(54) GOLF BALLS WITH THIN MOISTURE VAPOR BARRIER LAYER

(75) Inventors: Matthew F. Hogge, Mattapoisett, MA (US); Douglas E. Jones, Dartmouth, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/105,906

(22) Filed: Mar. 25, 2002

(65) Prior Publication Data

US 2003/0181601 A1 Sep. 25, 2003

(51) Int. Cl.[7] ............................ A63B 37/00; C08G 61/02
(52) U.S. Cl. ................... 528/396; 528/397; 473/354; 473/374; 473/376
(58) Field of Search ................... 528/396, 397; 473/354, 374, 376

(56) References Cited

U.S. PATENT DOCUMENTS

| | | | |
|---|---|---|---|
| 4,225,647 A | * 9/1980 | Parent | |
| 5,072,944 A | * 12/1991 | Nakahara | |
| 5,665,280 A | * 9/1997 | Tropsha | |
| 5,820,488 A | 10/1998 | Sullivan et al. | 473/374 |
| 5,875,891 A | 3/1999 | Snell | 206/315.9 |
| 5,885,172 A | 3/1999 | Hebert et al. | 473/354 |
| 5,919,100 A | 7/1999 | Boehm et al. | 473/354 |
| 6,132,324 A | 10/2000 | Hebert et al. | 473/378 |
| 6,180,715 B1 | 1/2001 | Schmidt | 524/611 |
| 6,207,784 B1 | 3/2001 | Rajagopalan | 528/71 |
| 6,232,389 B1 | 5/2001 | Feeney et al. | 524/450 |
| 6,287,216 B1 | 9/2001 | Boehm | 473/354 |

FOREIGN PATENT DOCUMENTS

WO 01/39845 * 6/2001

* cited by examiner

*Primary Examiner*—David J. Buttner
(74) *Attorney, Agent, or Firm*—William B. Lacy

(57) ABSTRACT

A golf ball comprising a core, a cover, and at least one water vapor barrier layer, wherein the water vapor barrier layer comprises at least one layer formed from poly-para-xylylene and its derivatives.

32 Claims, No Drawings

GOLF BALLS WITH THIN MOISTURE VAPOR BARRIER LAYER

FIELD OF THE INVENTION

The present invention relates to golf balls, more particularly to golf balls having thin water vapor barrier layers.

BACKGROUND OF THE INVENTION

Solid core golf balls are well known in the art. Typically, the core is made from polybutadiene rubber material, which provides the primary source of resiliency for the golf ball. A known drawback of polybutadiene cores cross-linked with peroxide and/or zinc diacrylate is that this material is adversely affected by absorption of water vapor, which reduces the resiliency of the cores and degrades their properties. Thus, these cores must be covered quickly to maintain optimum ball properties. A cover that protects the core from the elements and repeated impacts from golf clubs is typically made from ionomer resins, balata, and urethane, among other materials. Ionomer covers, particularly hard ionomers, offer some protection against the absorption of water vapor. However, it is more difficult to control or impart spin to balls with hard covers. Conventional urethane covers provide better ball control but offer less resistance to water vapor than ionomer covers.

Prolonged exposure to high humidity and elevated temperature may be sufficient to allow water vapor to invade the cores of some commercially available golf balls. For example, at 38° C. and 90% humidity over a sixty day period, significant amounts of moisture enter the cores and reduce the initial velocity of the balls by 1.8 ft/s to 4.0 ft/s or greater. The change in compression may vary from about 5 PGA to about 10 PGA or greater. The absorbed water vapor also reduces the golf ball coefficient of restitution ("COR"). When a golf ball is subjected to prolonged storage and/or use under ambient conditions such as 25–35% RH, as well as conditions of high temperature and high humidity, the COR of the golf ball tends to decrease over time due to water vapor absorption.

Several prior patents have addressed the water vapor absorption problem. U.S. Pat. No. 5,820,488 discloses a golf ball having a water vapor barrier ("WVB") layer disposed between a core and a cover. The WVB layer preferably has a water vapor transmission ("WVT") rate lower than that of the cover layer. The WVB layer may comprise polyvinylidene chloride ("PVDC") or vermiculite. It can also be formed by an in situ reaction between a barrier-forming material and the outer surface of the core. The barrier properties of PVDC are best at or below ambient temperature, but degrade rapidly at elevated temperatures. U.S. Pat. Nos. 5,885,172 and 6,132,324 disclose, among other things, a golf ball with a polybutadiene or wound core having an ionomer inner cover and a relatively soft outer cover. The hard ionomer inner cover offers some resistance to water vapor absorption, while the soft outer cover provides desirable ball control. U.S. Pat. No. 6,232,389 discloses the application of a dispersed exfoliated layered filler in an elastomeric polymer based barrier coating mixture so as to reduce water vapor permeability in golf balls and other objects by at least 5-fold. Preferable fillers include layered silicates such as bentonite, vermiculite, montmorillonite, nontronite, beidellite, volkonskoite, hectorite, saponite, laponite, sauconite, magadiite, kenyaite, and ledikite. U.S. Pat. No. 6,287,216 discloses a wounded golf ball having a liquid center surrounded by a thermoplastic core layer formed of a hydrophobic material that has a water vapor permeation rate of less than about 170 g·mil/100 in²·24 h. Additionally, U.S. Pat. No. 5,875,891 discloses an impermeable packaging for golf balls to limit water absorption during storage.

As it becomes common practice to implement various materials of different properties to construct two-piece and multi-layer golf balls that are susceptible to water vapor absorption, there presents a need for a WVB layer within the golf balls. It is also desirable to minimize the WVB layer thickness such that characteristics and playability of the golf ball are unaffected.

SUMMARY OF THE INVENTION

The present invention is directed to a golf ball having a core, a cover, and a thin WVB layer having at least one layer that is formed from poly-para-xylylene and its derivatives ("parylenes"). The thin WVB layer has a WVT rate that is less than the WVT rate of the cover. Preferably, the WVT rate of the thin WVB layer is less than about 0.80 g·mil/100 in²·24 h at 38° C. and 90% relative humidity. Parylenes have a general structure:

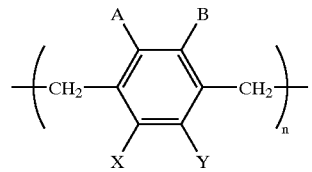

where
A=a hydrogen or a group VIIA element;
B=a hydrogen or a group VIIA element;
X=a hydrogen or a group VIIA element;
Y=a hydrogen or a group VIIA element;
n=an integer between 1 and 100; and
A, B, X and Y may be the same or different from each other.

The parylenes are selected as materials of choice to form the thin WVB layer in part because they provide conformal, pinhole-free thin coatings that have superior WVB properties. Low WVT rates are typically exhibited by halogenated parylenes, in which at least one of the four moieties (A, B, X and Y) is a group VIIA element. Preferably, the group VIIA element is fluorine, chlorine, bromine, iodine, or astatine; more preferably, the element is chlorine. Among the commercially available halogenated parylenes suitable as the WVB materials, including poly-para-xylylene ("parylene N"), poly-chloro-para-xylylene ("parylene C"), and poly-dichloro-para-xylylene ("parylene D"), parylene C stands out as the most preferable to form the thin WVB layer in accordance with the present invention.

Because the WVB layer comprising parylenes is typically formed via vapor deposition polymerization at a steady rate, it is possible to produce a thin WVB layer of any thickness on golf ball cores or sub-assemblies in a controlled fashion. Preferably, the thin parylene-based WVB layer of the invention has a thickness of from about 0.025 μm to about 75 μm. More preferably, the thickness is from about 1 μm to about 25 μm; and most preferably, from about 3 μm to about 10 μm.

Optionally, the thin WVB layer comprising at least one parylene-based layer may further have an additional layer to enhance the overall WVB properties. This additional layer preferably has a thickness of less than 0.030 inches and a WVT rate of less than about about 0.80 g·mil/100 in²·24 h at 38° C. and 90% relative humidity. Materials suitable for this additional layer include, without limitation, poly-paraxylylene and its derivatives; polyvinylidene chloride; polyvinyl chloride; vermiculite; polyacrylonitrile; fluorohalocarbons including polychlorotrifluoroethylene copolymer, ethylene-tetrafluoroethylene copolymer; fluorinated ethylene propylene copolymer, polytetrafluoroethylene, polyvinylidene fluoride, polyvinyl fluoride, and perfluoroalkoxy resins; aluminum; silicon oxides; polyethylene terephthalate; polypropylene; high density polyethylene; multi-layer thermoplastic films; blends of ionomers; polyvinyl alcohol copolymers and polyamides; dispersions of acid salts of polyetheramines; and mixtures thereof.

In one embodiment of the present invention, the thin WVB layer is disposed immediately about the core. Alternatively, the WVB layer may be disposed anywhere between the core and the cover. The golf ball core is preferably a solid core having a diameter of at least about 1.00 inch. Preferably, the solid core has a diameter of at least about 1.550 inches. The golf ball cover preferably has a thickness of about 0.010 inches to about 0.080 inches.

In another embodiment of the invention, a golf ball comprises a core, a cover, at least one intermediate layer disposed between the core and the cover, and a first WVB layer comprising at least one layer formed from parylenes. The first WVB layer is also disposed between the core and the cover, preferably immediately about the core. Preferably, the first WVB layer has a thickness of less than 0.030 inches, and a WVT rate of less than about 0.80 g·mil/100 in²·24 h at 38° C. and 90% relative humidity. Optionally, a second WVB layer may be added between the core and the cover, having a thickness of less than 0.030 inches and a WVT rate of less than about 0.80 g·mil/100 in²·24 h at 38° C. and 90% relative humidity. The second WVB layer may or may not be immediately adjacent to the first WVB layer, preferably it is disposed immediately about the intermediate layer. The second WVB layer does, however, comprise at least one layer formed from the parylenes; polyvinylidene chloride; polyvinyl chloride; vermiculite; polyacrylonitrile; fluorohalocarbons including polychlorotrifluoroethylene copolymer, ethylene-tetrafluoroethylene copolymer; fluorinated ethylene propylene copolymer, polytetrafluoroethylene, polyvinylidene fluoride, polyvinyl fluoride, and perfluoroalkoxy resins; aluminum; silicon oxides; polyethylene terephthalate; polypropylene; high density polyethylene; multi-layer thermoplastic films; blends of ionomers; polyvinyl alcohol copolymers and polyamides; dispersions of acid salts of polyetheramines; and mixtures thereof.

In yet another embodiment of the present invention, a golf ball comprises a core having a center and at least one outer core layer, a cover, and a first WVB layer disposed between the center and the cover. The first WVB layer comprises at least one layer formed from parylenes. The first WVB layer also has a thickness of less than about 0.030 inches and a WVT rate of less than about 0.80 g·mil/100 in²·24 h at 38° C. and 90% relative humidity, and may be disposed immediately about the outer core layer. Preferably, the center of the core has an outer diameter from about 0.75 inches to about 1.25 inches, while the outer core layer has a thickness of from about 0.01 inches to about 0.50 inches. The core center may be solid or fluid-filled. At least one optional intermediate layer may be disposed between the outer core layer and the cover. The cover, on the other hand, may comprise at least one inner cover layer and at least one outer cover layer. In this particular embodiment, it may be advantageous to incorporate a second WVB layer having a thickness of less than about 0.030 inches and a WVT rate of less than about 0.80 g·mil/100 in²·24 h at 38° C. and 90% relative humidity. The second WVB layer preferably is not immediately adjacent to the first WVB layer, so as to protect a separate component of the golf ball construction from water vapor adsorption.

DETAILED DESCRIPTION OF THE INVENTION

Broadly, the present invention is directed to a golf ball comprising a thin water vapor barrier ("WVB") layer. The ball may be a two-piece, multi-layer, or wound ball having cores, intermediate layers, covers and/or coatings comprising a thin WVB layer of the type disclosed herein. The ball may also be a one-piece ball having a homogenous core and a coating comprising the thin WVB layer.

A "cover" or a "core" as these terms are used herein includes a structure comprising either a single mass or one with two or more layers. As used herein, a core described as comprising a single mass means a unitary or one-piece core. The layer thus includes the entire core from the center of the core to its outer periphery. A core, whether formed from a single mass, two or more layers, or a liquid center may serve as a center for a wound ball. An intermediate layer may be incorporated, for example, with a single layer or multi-layer cover, with a single mass or multi-layer core, with both a single layer cover and core, or with both a multi-layer cover and a multi-layer core. A layer may additionally be composed of a tensioned elastomeric material. Intermediate layers of the type described above are sometimes referred to in the art, and, thus, herein as well, as an inner cover layer, as an outer core layer, or as a mantle layer.

The golf ball core can be made from any suitable core materials including without limitation natural rubber; polybutadiene; polyisoprene; styrene-butadiene; styrene-propylene-diene rubber; ionomer resins; polyamides; urethanes; polyesters; plastomers; metallocene catalyzed polyolefins; and thermoplastic elastomers such as Pebax® (Elf-Atochem), Hytrel® (DuPont) and Kraton® (Shell Chemical). The core materials can also be formed from castable materials including epoxy, silicone, urethane, polyurea, and reactive combinations thereof, as well as reaction injection molded ("RIM") polyurethane or polyurea materials.

The golf ball cover is preferably tough, cut-resistant, and selected from conventional materials used as golf ball covers based on the desired performance characteristics. The cover may comprise one or more layers, and may be formed via casting, injection molding, reaction injection molding ("RIM"), co-injection molding, or other methods known to those skilled in the art. Suitable cover materials include without limitation ionomer resins such as Surlyn® (DuPont); blends of high and/or low acid ionomer resins; thermoplastic or thermoset polynrethanes or polyurea; acrylic acids, methacrylic acids, plastomers; metallocene catalyzed polyolefins; thermoplastic rubber polymers consisting of block copolymers in which the elastomeric midblock of the molecule is an unsaturated rubber or a saturated olefin rubber such as Kraton®; polyethylene; and synthetic or natural vulcanized rubbers such as balata.

Other suitable core and cover materials are disclosed in U.S. Pat. No. 5,919,100, which is incorporated herein by reference in its entirety. Preferably, the core is made from a polybutadiene rubber material and the cover is made from a composition comprising a thermoset or thermoplastic polyurethane or polyurea, or a composition comprising an ionomer resin. The cover may further comprise compositions of polymer blends, as well as conventional additives such as catalysts; surfactants; blowing agents for foams; stabilizers; metals; colorants including pigments and dyes; fillers; viscosity modifiers; release agents; plasticizers; processing aids; antioxidants; compatibility agents; dispersing agents; UV absorbers and hindered amine light stabilizers. Examples of suitable polymer blends and additives are described in U.S. Pat. No. 6,207,784, the disclosure of which is incorporated herein by reference in its entirety.

To prevent or minimize the penetration of water vapor into the core of a golf ball, a thin WVB layer may be disposed anywhere between the core and the cover, preferably immediately around the core. The WVB layer should have a water vapor transmission ("WVT") rate that is lower than that of the cover, and preferably less than the WVT rate of an ionomer resin such as Surlyn®, which is about 0.80 g mil/100 in$^2$·24 h at 38° C. and 90% relative humidity ("RH"). The WVT rate is defined as the mass of water vapor that diffuses into a material of a given thickness per unit area per unit time at a specified temperature and humidity differential. Standard test methods to evaluate WVT rates include, among others, ASTM E96 entitled "Test Methods for Water Vapor Transmission of Materials," ASTM F372-99 entitled "Standard Test Method for Water Vapor Transmission Rate of Flexible Barrier Materials Using an Infrared Detection Technique," and ASTM F1249-01 entitled "Standard Test Method for Water Vapor Transmission Rate Through Plastic Film and Sheeting Using a Modulated Infrared Sensor."

In accordance to an embodiment of the invention, the WVB layer is a thin polymeric layer that provides a conformal, pinhole-free film encapsulating the golf ball core. Conformal coatings can offer golf ball cores protection from water vapor absorption, prevent mechanical and thermal damages, resist abrasion, and enhance performance. An exemplary conformal coating material for the thin WVB layer is a family of thermoplastic polymers that include, without limitation, poly-para-xylylene and its derivativess ("parylenes"). Parylenes have a general structure:

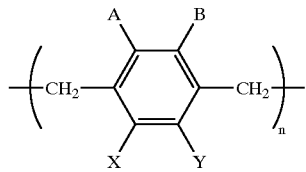

where
A=a hydrogen or a group VIIA element;
B=a hydrogen or a group VIIA element;
X=a hydrogen or a group VIIA element;
Y=a hydrogen or a group VIIA element;
n=an integer between 1 and 100; and
A, B, X and Y may be the same or different from each other.

Parylenes provide conformal, continuous, and pinhole-free protective coatings to a variety of materials and surfaces with uniformed thicknesses ranging from a few Å to several mils. Parylene coatings enable a variety of surface characteristics to the substrates, such as low permeability to water vapor and corrosive gases, superior chemical resistance to acids, alkalis and organic solvents, as well as biocompatibility and biostability. Parylene coatings are also solid without residue to cause cross-contamination, and known to significantly reduce friction, eliminate inherent surface tackiness, protect against discoloration and contaminant entrapment, and extend the useful life of the substrates.

While the WVB properties vary among the parylenes, sufficiently low WVT rates are typically exhibited by halogenated parylenes wherein at least one of the four moieties (A, B, X and Y) on the benzene ring is a group VIIA element ("halogen"). Preferably, the group VIIA halogen is fluorine, chlorine, bromine, iodine, or astatine; more preferably, the halogen is chlorine. While commercially available halogenated parylenes such as are poly-para-xylylene ("parylene N"), poly-chloro-para-xylylene ("parylene C"), and poly-dichloro-para-xylylene ("parylene D") are all suitable WVB materials in accordance to the present invention, parylene C is particularly preferred due to its exceptionally low permeability to water vapor and corrosive gases. Alternatively, any other halogenated parylenes having one or more halogen atoms on the benzene ring may also be suitable for formulating the thin WVB layer.

TABLE 1

Water Vapor Transmission Rates

| Polymeric Material | WVT Rates (g · mil/100 in$^2$ · 24 h) |
|---|---|
| Parylene N | 1.49(a) |
| Parylene C | 0.21(a) |
| Parylene D | 0.25(a) |
| Surlyn ® | 0.80 |
| Epoxides | 1.79–2.38(b) |
| Silicones | 4.4–7.9(b) |
| Urethanes | 2.4–8.7(b) |

* ASTM E96 conducted at 38° C. and 90% RH.
(a)Kirk-Othmer Encyclopedia of Chemical Technology, 4$^{th}$ Edition, Supplement. John Wiley & Sons, Inc., 1998.
(b)Lacari, J. J. and Brands, E. R., Machine Design, May 25, 1967, p. 192.

The WVT rates of parylenes N, C and D have been measured at thicknesses less than 0.1 μm. Normalized to equivalent thickness, the WVT values are the same for all thicknesses. Table 1 above lists the WVT rates of the parylenes and compares them to certain conventional coating materials. Parylene C is therefore the most preferable choice for the present invention. To effectively reduce the permeation of water vapor into and/or out of the golf ball, parylene-based WVB layer having a thickness ranging from about 0.025 μm to about 75 μm may be employed. Preferably, the desirable thickness of the parylene-based WVB layer ranges from about 1 μm to about 25 μm; more preferably, from about 3 μm to about 10 μm. In comparison to typical golf ball core sizes and cover thicknesses, the parylene-based WVB layers, at the thicknesses described above, will not affect the core characteristics or the overall playability and performance of the golf balls.

Preferably, a golf ball in accordance to the present invention comprises a solid or multiple-layer solid core having an outer diameter of at least about 1.00 inch, more preferably of at least about 1.550 inches and most preferably of at least about 1.580 inches. The cover of this golf ball has a sufficient thickness to produce a 1.680-inch diameter golf ball. The cover thickness ranges from about 0.010 inches to about 0.080 inches. While a cover thickness from about 0.010 inches to about 0.040 inches is most preferred, a thicker cover having a thickness from about 0.040 inches to about 0.080 inches and, more preferably, from about 0.050 inches to about 0.070 inches may be used.

The thin WVB layer of the present invention may comprise one or more layers of parylene coatings having the same or different species of parylenes in each layer. For example, it may be desirable to form a first layer using parylene N, because it has the best penetration ability and provides the most conformal coating. Then a second layer of parylene C may be used to provide the golf ball with the best WVB effect. Alternatively, the thin WVB layer comprising at least one parylene-based layer may have one or more non-parylene layers to further enhance the overall performance of the thin WVB layer. The thickness of total WVB layer having at least one parylene-based layer is preferably less than 0.030 inches. Suitable WVB materials for the one or more non-parylene layers include without limitation polyvinylidene chloride; polyvinyl chloride; vermiculite; polyacrylonitrile; fluorohalocarbons including polychlorotrifluoroethylene copolymer (Aclar®), ethylene-tetrafluoroethylene copolymer; fluorinated ethylene propylene copolymer, polytetrafluoroethylene, polyvinylidene fluoride, polyvinyl fluoride, and perfluoroalkoxy resins; aluminum; SiOx; polyethylene terephthalate ("PET"); polypropylene; high density polyethylene ("HDPE"); multi-layer thermoplastic films; blends of ionomers; polyvinyl alcohol copolymers and polyamides; and dispersions of acid salts of polyetheramines.

In accordance to another aspect of the invention, the thin WVB layer having the compositions disclosed herein can be applied to any and all golf ball constructions to minimize water vapor influx. The golf ball construction may comprise at least one intermediate layer disposed between the core and the cover. One or more of the thin WVB layers may be disposed between the core and the cover. Preferably, a first thin WVB layer is disposed immediately around the core. Optionally, a second thin WVB layer may be disposed between the intermediate layer and the cover, preferably immediately about the intermediate layer. Application of multiple thin WVB layers is especially beneficial when one or more of golf ball component layers or the innermost core center are made from a rubber or polybutadiene material or from other materials that are adversely affected by water vapor. Advantageously, each thin WVB layer protects a preselected portion of the golf ball, such that if water vapor penetrates an outer thin WVB layer, the interior layers remain protected by the inner thin WVB layers. The compositions of each thin WVB layer may be the same or different from each other, and may or may not comprise a parylene-based layer. Preferably, at least one of the thin WVB layers comprises at least one of the parylenes.

In a further embodiment of the invention, the parylene-based thin WVB layer is used in a golf ball with a multi-layer core construction to minimize the transmission of moisture vapor to any part of the multi-layer core. Specifically, the golf ball construction has a core comprising a center and at least one outer core layer. Preferably, the golf ball comprises a dual-core construction with a core having a center and an outer core layer. The center may have an outer diameter from about 0.75 inches to about 1.25 inches, and the outer core layer may have a thickness of from about 0.01 inches to about 0.50 inches. The cover may comprise a single layer, or a multi-layer structure having at least one inner cover layer and at least one outer cover layer. Preferably, the cover is a double-cover having an inner cover layer and an outer cover layer. Optionally, the golf ball construction may further comprise at least one intermediate layer disposed between the core and the cover. Variations of the dual-core, double-cover construction and suitable materials for each layers are described in U.S. patent application Ser. Nos. 09/782,782, 09/951,963, and 10/051,715, the disclosures of which are incorporated herein by reference in their entirety.

The parylene-based WVB layer may further serve to prevent water vapor from exiting the golf ball, particularly when the ball comprises a fluid-filled core. Suitable fluids for the fluid-filled cores include without limitation air, aqueous solutions, liquids, gels, foams, hot-melts, other fluid materials and combinations thereof. Preferred fluids include water, oils, glycol, solutions such as salt water and corn syrup, and mixtures thereof. The fluids can further include pastes, as well as colloidal suspensions such as clay and barytes. Examples of suitable gels include water gelatin gels, hydrogels, water/methyl-cellulose gels, and gels comprised of copolymer rubber based materials such a styrene-butadiene-styrene rubber and paraffinic and/or naphthenic oil. Examples of suitable melts include waxes and hot melts. Hot-melts are materials, which at or about normal room temperatures are solid but at elevated temperatures become liquid. A high melting temperature is desirable since the liquid core is heated to high temperatures during the molding of the core center, the outer core layer, and the cover. Alternatively, suitable fluids also include low specific gravity fluids such as SAE 10 oil, SAE 30 oil, methanol, ethanol, ammonia, etc., or high specific gravity fluids such as glycerin and carbon tetrachloride.

In accordance to another aspect of the invention, the parylene-based thin WVB layer may be formed through a Vapor Deposition Polymerization ("VDP", a.k.a. Gas Phase Polymerization) process that is similar to Chemical Vapor Deposition ("CVD"). Specifically, substrates such as golf ball cores and golf ball sub-assemblies are first prepared for parylene coating by cleaning off oils and other surface contaminants. Pre-treatment with a multi-molecular layer of organosilane may be applied to promote adhesion of the parylene coating to the vacuum-stable substrates. The substrates may be fixed individually in an evacuated deposition chamber, or coated in a rotating barrel using a tumbling process.

The parylene precursor, a granular white powder, is first vaporized at about 150° C. and 1.0 torr vacuum in a vaporizer chamber. The resulting gaseous form of stable dimeric di-para-xylylene (2,2-paracyclophane) is further heated in a pyrolysis (quantitative cleavage) chamber to about 680° C. at about 0.5 torr vacuum, to directly break the two methylene-methylene bonds and yield stable monomeric diradicals, para-xylylene, also in a gaseous form. This monomer is thermally stable, but kinetically unstable. Finally, the monomer gas enters the deposition chamber at ambient temperature and about 0.1 torr vacuum. Other necessary components in this processing system include a mechanical vacuum pump and associated protective cold traps. Within the deposition chamber, the monomeric para-xylylene simultaneously absorbs and polymerizes on all surfaces of the substrates without any catalysts, solvents or accelerators. The resulting parylene coating is a high-molecular weight, amorphous, linear, crystalline, and transparent polymer with an all-carbon backbone that is completely free from potential mobile components (i.e., no outgassing). High-extent hydrophobicity due to the absence of polar moieties such as oxygen, nitrogen or sulfur links in the backbone, coupled with substantial crystallinity, makes the parylene coating very stable and extremely resistant to moisture vapor permeation, chemical attacks and hydrolytic breakdown.

The parylene coating forms at the molecular level simultaneously on all exposed surfaces, edges and crevices of the substrates outward in all directions as a conformal film at a rate of about 2 $\mu$m/min, effectively encapsulating the entire substrates. The coating thickness is therefore infinitely controllable with high precision from as little as a few Å to over several mils, making it possible to achieve required protection with minimal coating thickness. This polymerization and deposition process occurs without solvent emissions, and because it takes place at ambient temperature, the substrates are not exposed to thermal, mechanical or chemical stresses. The cure cycle is automatic, and occurs before deposition, requiring no testing or examination to confirm its completeness. After deposition, the coating thickness is confirmed by measuring film on witness strip/slides that accompany each batch. Its high purity, low moisture absorption and void of impurities allow parylene coating to be applied in a consistent manner so that its nearly negligible dimensional impact on the substrates is predictable and repeatable.

The present invention is further illustrated by the following non-limiting examples.

EXAMPLE

Example 1

Table 2 below shows averaged daily weight losses in grams of liquid-filled golf balls with and without a parylene C WVB layer under accelerated weather conditions (110° F.) over a 5-day period. Specifically, the golf ball samples all had fluid-filled centers and thermoplastic polyurethane covers. The group having no parylene C WVB layer was served as control. One sample group had a 1.5 μm parylene C WVB layer, another sample group had a 6.0 μm parylene C WVB layer.

TABLE 2

| Elapsed Time (hrs) | Averaged Weight Loss (g) | | |
|---|---|---|---|
| | No WVB layer | 1.5 μm WVB layer | 6.0 μm WVB layer |
| 24 | 0.09 | 0.08 | 0.04 |
| 48 | 0.17 | 0.15 | 0.075 |
| 72 | 0.23 | 0.23 | 0.11 |
| 96 | 0.30 | 0.32 | 0.14 |
| 120 | 0.38 | 0.39 | 0.17 |

Weight losses in the fluid-filled golf ball samples were presumably due primarily to water vapor escaping the fluid centers through the permeable thermoplastic covers. Calculated from the data tabulated in Table 2, rates of weight loss were 0.075 g/day for the no parylene group, 0.078 g/day for 1.5 μm coated group, and 0.034 g/day for the 6.0 μm coated group. While the 1.5 μm-thick parylene C WVB layer did not demonstrate significant WVB properties in this golf ball construction, it is apparent that the 6.0 μm-thick parylene C WVB layer effectively reduced the weight loss in the fluid-filled golf ball samples. Specifically, the 6.0 μm-thick parylene C WVB layer reduced the escape of water vapor from the core centers through the thermoplastic covers by 55%.

All patents and patent applications cited in the foregoing text are expressly incorporated herein by reference in their entirety.

The term "about," as used herein in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. Such modifications are also intended to fall within the scope of the appended claims.

What is claimed is:

1. A golf ball comprising a core, a cover, and at least one water vapor barrier layer, wherein the water vapor barrier layer comprises at least one layer having a thickness of about 3 μm to about 10 μm formed from poly-para-xylylene and its derivatives having a structure:

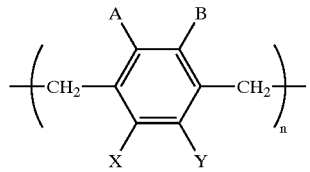

where
A=a hydrogen or a group VIIA element;
B=a hydrogen or a group VIIA element;
X=a hydrogen or a group VIIA element;
Y=a hydrogen or a group VIIA element;
n=an integer between 1 and about 100; and
A, B, X and Y may be the same or different from each other.

2. The golf ball of claim 1, wherein the water vapor barrier layer has a first water vapor transmission rate, the cover has a second water vapor transmission rate, and wherein the first water vapor transmission rate is less than the second.

3. The golf ball of claim 2, wherein the first water vapor transmission rate is less than about 0.80 g·mil/100 in²·24 h at 38° C. and 90% relative humidity.

4. The golf ball of claim 1, wherein the group VIIA element comprises fluorine, chlorine, bromine, iodine, or astatine.

5. The golf ball of claim 4, wherein the group VIIA element is chlorine.

6. The golf ball of claim 1, wherein the at least one layer of the water vapor barrier layer comprises poly-para-xylylene; poly-chloro-para-xylylene; poly-dichloro-para-xylylene; or a mixture thereof.

7. The golf ball of claim 6, wherein the at least one layer is formed from poly-chloro-para-xylylene.

8. The golf ball of claim 1, wherein the water vapor barrier layer further comprises an additional layer having a thickness of less than 0.030 inches and a water vapor transmission rate of less than about 0.80 g·mil/100 in²·24 h at 38° C. and 90% relative humidity.

9. The golf ball of claim 8, wherein the additional layer comprises poly-para-xylylene and its derivatives; polyvinylidene chloride; polyvinyl chloride; vermiculite; polyacrylonitrile; fluorohalocarbons; polychlorotrifluoroethylene copolymer; ethylene-tetrafluoroethylene copolymer; fluorinated ethylene propylene copolymer; polytetrafluoroethylene; polyvinylidene flouride; polyvinyl fluoride; perfluoroalkoxy resins; aluminum; silicon oxides; polyethylene terephthalate; polypropylene; high density polyethylene; multi-layer thermoplastic films; blends of ionomers; polyvinyl alcohol copolymers; polyamides; dispersions of acid salts of polyetheramines; or mixtures thereof.

10. The golf ball of claim 1, wherein the water vapor barrier layer is disposed immediately about the core.

11. The golf ball of claim 1, wherein the water vapor barrier layer is disposed between the core and the cover.

12. The golf ball of claim 1, wherein the core is a solid core having a diameter of at least about 1.00 inch.

13. The golf ball of claim 8, wherein the solid core has a diameter of at least about 1.550 inches.

14. The golf ball of claim 1, wherein the cover has a thickness of about 0.010 inches to about 0.080 inches.

15. The golf ball of claim 8, wherein the additional layer has a thickness of about 1 μm to about 25 μm and comprises poly-para-xylylene or its derivatives.

16. The golf ball of claim 1, wherein the golf ball further comprises an intermediate layer disposed between the core and the cover.

17. A golf ball comprising a core, a cover, at least one intermediate layer disposed between the core and the cover, and a first and second water vapor barrier layers disposed between the core and the cover, wherein the second water vapor barrier layer has a thickness of less than 0.030 inches and a water vapor transmission rate of less than about 0.80 g·mil/100 in$^2$·24 h at 38° C. and 90% relative humidity, and the first water vapor barrier layer comprises at least one layer formed from poly-para-xylylene and its derivative having a structure:

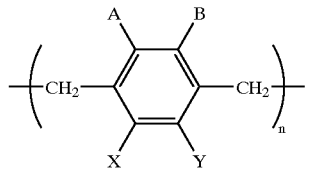

where
A=a hydrogen or a group VIIA element;
B=a hydrogen or a group VIIA element;
X=a hydrogen or a group VIIA element;
Y=a hydrogen or a group VIIA element;
n=an integer between 1 and 100; and
A, B, X and Y may be the same or different from each other.

18. The golf ball of claim 17, wherein the first water vapor barrier layer has a thickness of less than about 0.030 inches and a water vapor transmission rate of less than about 0.80 g·mil/100 in$^2$·24 h at 38° C. and 90% relative humidity.

19. The golf ball of claim 17, wherein the first water vapor barrier layer is disposed immediately about the core.

20. The golf ball of claim 17, wherein the additional layer comprises poly-para-xylylene and its derivatives; polyvinylidene chloride; polyvinyl chloride; vermiculite; polyacrylonitrile; fluorohalocarbons; polychlorotrifluoroethylene copolymer; ethylene-tetrafluoroethylne copolymer; fluorinated ethylene propylene copolymer; polytetrafluoroethylene; polyvinylidene fluoride; polyvinyl fluoride; perfluoroalkoxy resins; aluminum; silicon oxides; polyethylene terephthalate; polypropylene; high density polyethylene; multi-layer thermoplastic films; blends of ionomers; polyvinyl alcohol copolymers; polyamides; dispersions of acid salts of polyetheramines; or mixtures thereof.

21. The golf ball of claim 17, wherein the second water vapor barrier layer is not immediately adjacent to the first water vapor barrier layer.

22. The golf ball of claim 17, wherein the second water vapor barrier layer is disposed immediately about the intermediate layer.

23. The golf ball of claim 17, wherein at least one of the first or second vapor barrier layers has a thickness of about 0.025 μm to about 75 μm.

24. A golf ball comprising a core having a center and at least one outer core layer, a cover, and a first and second water vapor barrier layers disposed between the center and the cover, wherein the second water vapor barrier layer has a thickness of less than 0.030 inches and a water vapor transmission rate of less than about 0.80 g·mil/100 in$^2$·24 h at 38° C. and 90% relative humidity, and the first water vapor barrier layer comprises at least one layer formed from poly-para-xylylene and its derivatives having a structure:

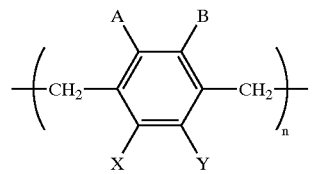

where
A=a hydrogen or a group VIIA element;
B=a hydrogen or a group VIIA element;
X=a hydrogen or a group VIIA element;
Y=a hydrogen or a group VIIA element;
n=an integer between 1 and 100; and
A, B, X and Y may be the same or different from each other.

25. The golf ball of claim 24, wherein the first water vapor barrier layer has a thickness of less than about 0.030 inches and a water vapor transmission rate of less than about 0.80 g·mil/100 in$^2$·24 h at 38° C. and 90% relative humidity.

26. The golf ball of claim 24, wherein the first water vapor barrier layer is disposed immediately about the outer core layer.

27. The golf ball of claim 24, wherein the center has an outer diameter from about 0.75 inches to about 1.25 inches, and the outer core layer has a thickness of from about 0.01 inches to about 0.45 inches.

28. The golf ball of claim 24, wherein the core is fluid-filled.

29. The golf ball of claim 24, wherein at least one intermediate layer is disposed between the outer core layer and the cover.

30. The golf ball of claim 24, wherein the cover comprises at least one inner cover layer and at least one outer cover layer.

31. The golf ball of claim 24, wherein the second water vapor barrier layer is not immediately adjacent to the first water vapor barrier layer.

32. The golf ball of claim 24, wherein at least one of the first or second vapor barrier layers has a thickness of about 1 μm to about 25 μm.

* * * * *